(12) United States Patent
Thompson et al.

(10) Patent No.: US 12,169,637 B2
(45) Date of Patent: Dec. 17, 2024

(54) READ ACCESS DURING CLONE VOLUME SPLIT OPERATION

(71) Applicant: NetApp Inc., San Jose, CA (US)

(72) Inventors: Cheryl Marie Thompson, Sunnyvale, CA (US); Garima Choudhary, San Jose, CA (US); Rajesh Sudarsan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 20 days.

(21) Appl. No.: 18/308,704

(22) Filed: Apr. 28, 2023

(65) Prior Publication Data

US 2024/0361944 A1 Oct. 31, 2024

(51) Int. Cl.
*G06F 3/06* (2006.01)

(52) U.S. Cl.
CPC ............ *G06F 3/065* (2013.01); *G06F 3/0619* (2013.01); *G06F 3/0659* (2013.01); *G06F 3/0673* (2013.01)

(58) Field of Classification Search
CPC ...... G06F 3/065; G06F 3/0619; G06F 3/0659; G06F 3/0673
See application file for complete search history.

(56) References Cited

U.S. PATENT DOCUMENTS

| | | | |
|---|---|---|---|
| 7,913,051 B1 * | 3/2011 | Todd ..................... | G06F 16/137 711/108 |
| 10,031,682 B1 | 7/2018 | George et al. | |
| 10,360,099 B2 | 7/2019 | Subramanian et al. | |
| 10,852,976 B2 | 12/2020 | George et al. | |
| 11,016,943 B2 | 5/2021 | George et al. | |
| 11,144,498 B2 | 10/2021 | George et al. | |
| 11,188,500 B2 | 11/2021 | Kushwah et al. | |
| 2007/0016740 A1 * | 1/2007 | Somavarapu ........... | G06F 3/064 711/162 |
| 2009/0222596 A1 * | 9/2009 | Flynn .................... | G06F 3/0659 711/155 |

(Continued)

FOREIGN PATENT DOCUMENTS

| | | |
|---|---|---|
| EP | 2372520 A1 | 10/2011 |
| WO | 2005111802 A2 | 11/2005 |
| WO | 2017146805 A1 | 8/2017 |

OTHER PUBLICATIONS

U.S. Appl. No. 18/308,703, filed Apr. 28, 2023, Thompson et al.

(Continued)

*Primary Examiner* — Masud K Khan
(74) *Attorney, Agent, or Firm* — Cooper Legal Group, LLC

(57) ABSTRACT

Techniques are provided for processing read operations while splitting a clone volume from a parent volume whose data is stored within objects of an object store. A transfer map is created to track mappings of child object identifiers to parent object identifiers of the parent objects to copy as child objects having the child object identifiers. The transfer map for the object store is traversed to copy the parent objects as the child objects for the split clone operation. The child objects are verified as being successfully created with valid data. In response to determining that the parent object has been copied as the child object, a context check is performed using the reverse map to verify a block within the child object. In response a successful context check, the read operation is processed using the block of the child object.

20 Claims, 10 Drawing Sheets

(56) References Cited

U.S. PATENT DOCUMENTS

| | | |
|---|---|---|
| 2017/0004046 A1 | 1/2017 | Adkins |
| 2017/0185531 A9 | 6/2017 | Chen et al. |
| 2019/0220454 A1 | 7/2019 | Matsui et al. |
| 2020/0285611 A1 | 9/2020 | George et al. |
| 2020/0285613 A1 | 9/2020 | George et al. |
| 2020/0285614 A1 | 9/2020 | George et al. |

OTHER PUBLICATIONS

Nguyen H.A., "Clone Management for Evolving Software," IEEE Transactions on Software Engineering, 2012, vol. 38(5), pp. 1008-1026.

Notice of Allowance mailed on Jun. 26, 2024 for U.S. Appl. No. 18/308,703, filed Apr. 28, 2023, 12 pages.

Tsantalis N., et al., "Assessing the Refactorability of Software Clones," IEEE Transactions on Software Engineering, 2015, vol. 44(11), pp. 1055-1090.

\* cited by examiner

READ ACCESS DURING CLONE VOLUME SPLIT OPERATION

BACKGROUND

Many storage systems may provide tiering capabilities where data of a primary volume can be tiered out (or stored) to different storage tiers. One of the storage tiers may include an object store where data of the primary volume is stored within objects in the object store. The storage systems may also provide other storage capabilities such as the ability to create clone volumes of the primary volume. When a clone volume of the primary volume is created, the clone volume references the original data of the primary volume. This makes the clone volume storage efficient because the data of the primary volume is not copied for the clone volume.

DESCRIPTION OF THE DRAWINGS

Embodiments/aspects of the present technology will be described and explained through the use of the accompanying drawings in which.

Figure 1:
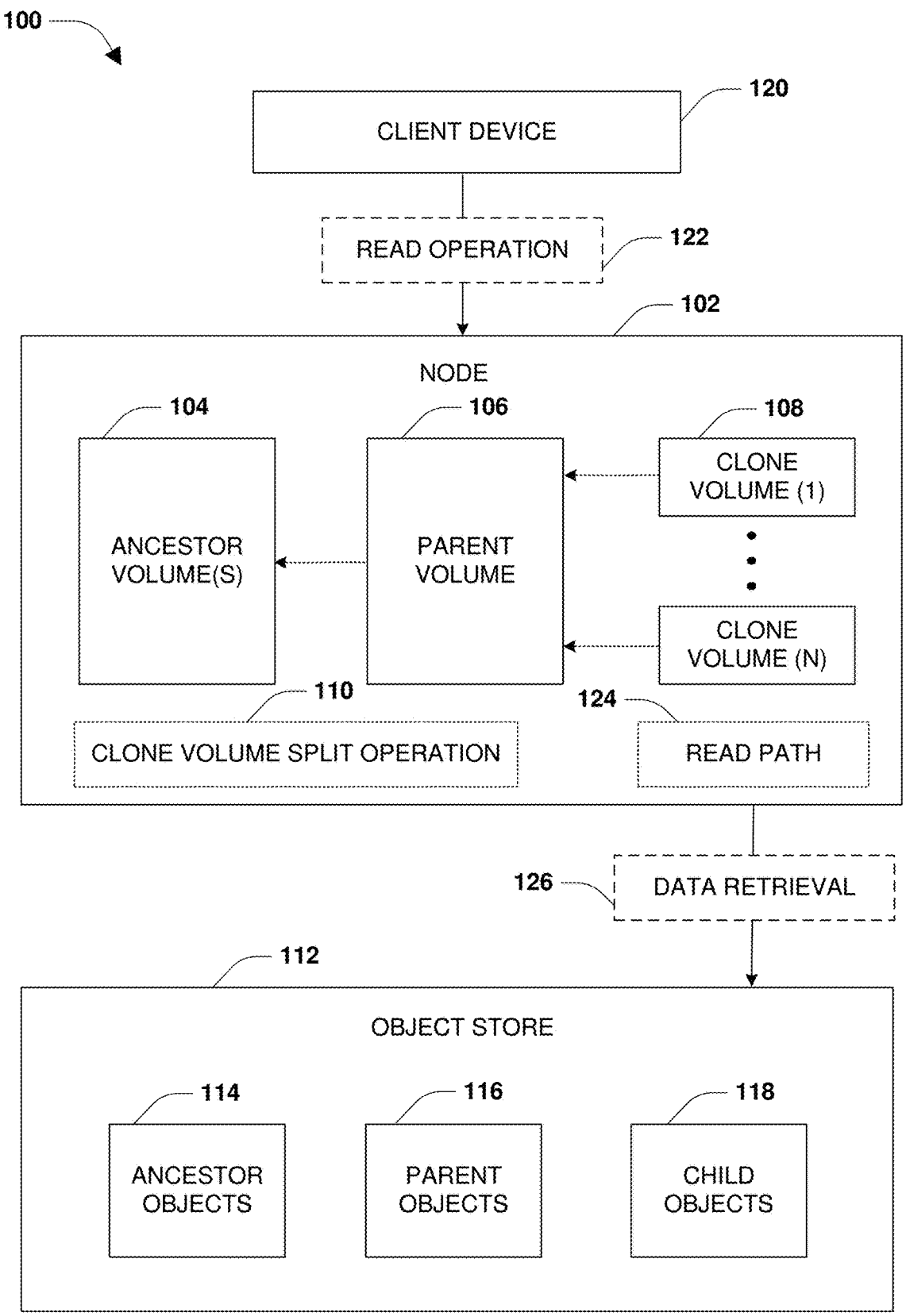
FIG. 1 is a block diagram illustrating an example of providing read access while performing a clone volume split operation, in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

An object store may provide long term, scalable, and efficient storage where data is stored within objects. The object store may be hosted on-premise or may be hosted by a cloud service provider. A storage system (e.g., a hybrid storage system) hosting a primary volume may tier out (i.e., store) data of the primary volume to the object store. For example, the storage system may tier out less frequently accessed data of the primary volume to the object store for long term cheaper storage compared to a performance tier of faster storage where more frequently access data of the primary volume may be stored. The storage system makes the primary volume accessible to client systems (may also be referred to as "clients") for accessing data of the primary volume stored within one or more storage tiers.

The storage system may provide cloning functionality used to create clone volumes of a volume. A volume being cloned may be referred to as a parent volume. The creation of a clone volume from a parent volume is quick and storage efficient because the underlying data of the parent volume is not copied/duplicated for the clone volume, which conserves storage space and enables almost instantaneous creation of any number of clone volumes. Instead of copying the parent volume data, the clone volume initially references (or points to) the data of the parent volume. As changes are made to the parent volume or the clone volume (the volumes diverge from one another), separate copies of data are made so that changes to the clone volume do not modify data of the parent volume and changes to the parent volume do not modify data of the clone volume. In some instances, the parent volume may be a clone of another volume (also referred to as "an ancestor volume"), which in turn could also be a clone of a different volume, etc.

A clone volume split operation may be performed to split the clone volume from the parent volume. To split the clone volume from the parent volume, any parent data of the parent volume that is referenced by the clone volume is copied to create clone data (child objects) that is part of the clone volume separate from the parent volume. This results in the clone volume becoming a standalone volume that no longer references the data of the parent object.

If the data of the parent volume has been stored within parent objects of an object store (e.g., an object store hosted by a cloud storage provider remotely accessible over a network to a node providing clients with access to the parent volume and the clone volume), then the parent objects are retrieved over the network from the object store, copied as the child objects, and then stored back into the object store over the network. This results in a substantial amount of network usage, time, and operations (may also be referred to as "ops" (e.g., a read, a copy, and a store operation for a single object), which is costly (e.g., the cloud storage provider may charge per operation).

Accordingly, the techniques provided herein improve the overall efficiency of the clone volume split operations reducing network usage, time, number of ops, and overall cost of a clone volume split operation. The clone volume split operation is improved by utilizing a transfer map and a reverse map to quickly determine what child objects are to be created within the object store allowing read operations to be processed during the clone volume split operation so that client access to the clone volume is not blocked until completion of the clone volume split operation. Furthermore, copy instructions are issued to the object store to copy corresponding parent objects as the child objects without retrieving the parent objects from the object store, copying the parent objects as child objects, and storing the child objects back into the object store. This reduces/eliminates client downtime because a client can read from the clone volume without waiting for the clone volume split operation to complete.

FIG. 1 is a block diagram illustrating an example of a system 100 for providing read access while performing a clone volume split operation. A node 102 may host one or more volumes that are made accessible to clients. The node 102 may be implemented as a virtual machine, a container, a serverless thread, a server, hardware, software, or a combination thereof. The node 102 may be hosted on-premise (e.g., within a same network as the clients), within a cloud computing environment, or elsewhere. A parent volume 106 may be hosted by the node 102 that provides the clients with access to the parent volume 106. At least some data of the parent volume 106 may be tiered out (or stored) to an object store 112 (e.g., an object stored hosted on-premise or remotely hosted by a cloud storage environment). The data of the parent volume 106 may be stored within parent objects 116 tiered out to the object store 112. The data may be stored within slots of a parent object, and a slot header of the parent object (or a separate metafile) may comprise metadata describing the slots (e.g., how to locate the data within a slot, what data of the parent volume 106 is stored within the slot, whether data within the slot is compressed, how to decompress the data in the slot, checksum or other information used to check the integrity of the parent object and/or data within the slots of the parent object, whether data in a slot is in-use or no longer used or referenced, a sequence number of the parent object, etc.). In some embodiments, all the data of the parent volume 106 is tiered out (or stored in) to the object store 112. In some embodiments, some of the data of the parent volume 106 is tiered out to the object store 112 and some of the data of the parent volume 106 is maintained local to the node 102 such as within a performance tier of on-premise storage.

Volume cloning functionality may be used to create any number of clone volumes of the parent volume 106, such as a first clone volume 108. Instead of copying the data of the parent volume 106, which could be tiered to the object store 112 within the parent objects 116, the first clone volume 108 initially references the data of the parent volume 106. As changes are made to the parent volume 106, the changes are separately stored for the parent volume 106 so that the changes do not modify the first clone volume 108. As changes are made to the first clone volume 108, the changes are stored for the first clone volume 108 so that the changes do not modify the parent volume 106. The changes made to the first clone volume 108 may also be tiered out to the object store 112 within child objects 118. In some embodiments, the parent volume 106 may be a clone of another volume such as an ancestor volume 104 whose data may be tiered to the object store 112 within ancestor objects 114.

A clone volume split operation 110 may be performed to split the first clone volume 108 from the parent volume 106. The clone volume split operation 110 identifies data of the parent volume 106 that is still referenced by the first clone volume 108. The clone volume split operation 110 copies that data of the parent volume 106 to create copies of the data that are now part of the first clone volume 108. In this way, the first clone volume 108 becomes a standalone volume that no longer references data of other volumes such as the parent volume 106. The clone volume split operation 110 becomes complicated and technically challenging when some of the data of the parent volume 106 is stored in the object store 112 within the parent objects 116. As will be further discussed in relation to method 200 of FIG. 2, the clone volume split operation 110 is improved to split a clone volume more efficiently and quickly from a parent volume whose data is tiered to the object store 112.

During the clone volume split operation 110, a client device (also referred to as a "client") 120 may transmit a read operation 122 (or a write operation) to the node 102. The read operation 122 may attempt to read data from the first clone volume 108. In response to receiving the read operation 122, a custom read path 124 (or a write path) is initiated for processing the read operation 122 because the read operation 122 could be directed to data already copied as a child object or data may still be residing in a parent object not yet copied as the child object. The read path 124 performs data retrieval 126 of the data requested by the read operation 122 based upon whether the data has already been copied or not to the child object, which is described in further details in relation to method 200 of FIG. 2. Without the custom read path 124, the client device 120 may be unable to read from the first clone volume 108 until the clone volume split operation 110 fully completes, which is undesirable.

Figure 2:
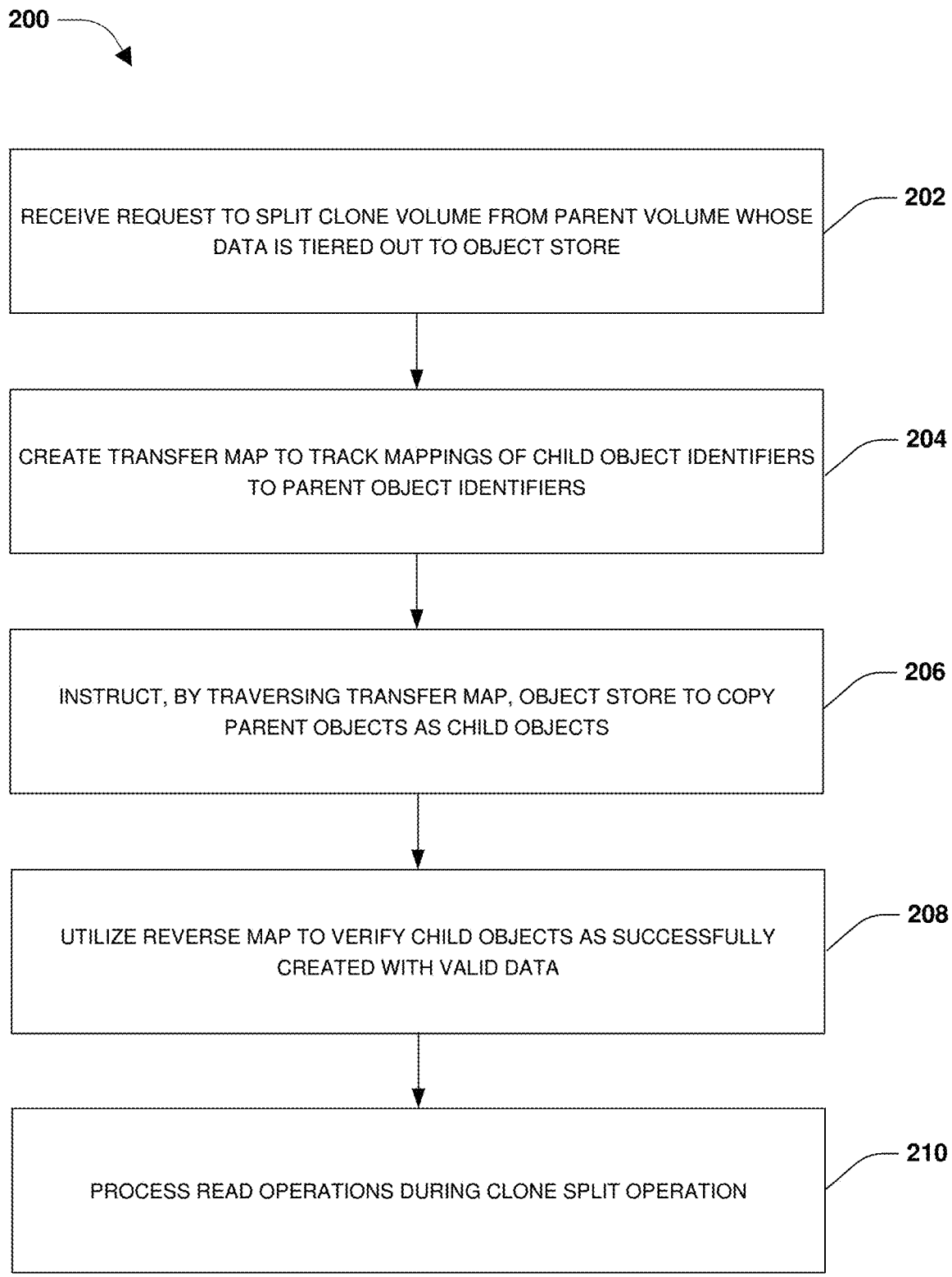
FIG. 2 is a flow chart illustrating an example of a set of operations of a method for providing read access while performing a clone volume split operation, in accordance with various embodiments of the present technology.
Figure 3A:
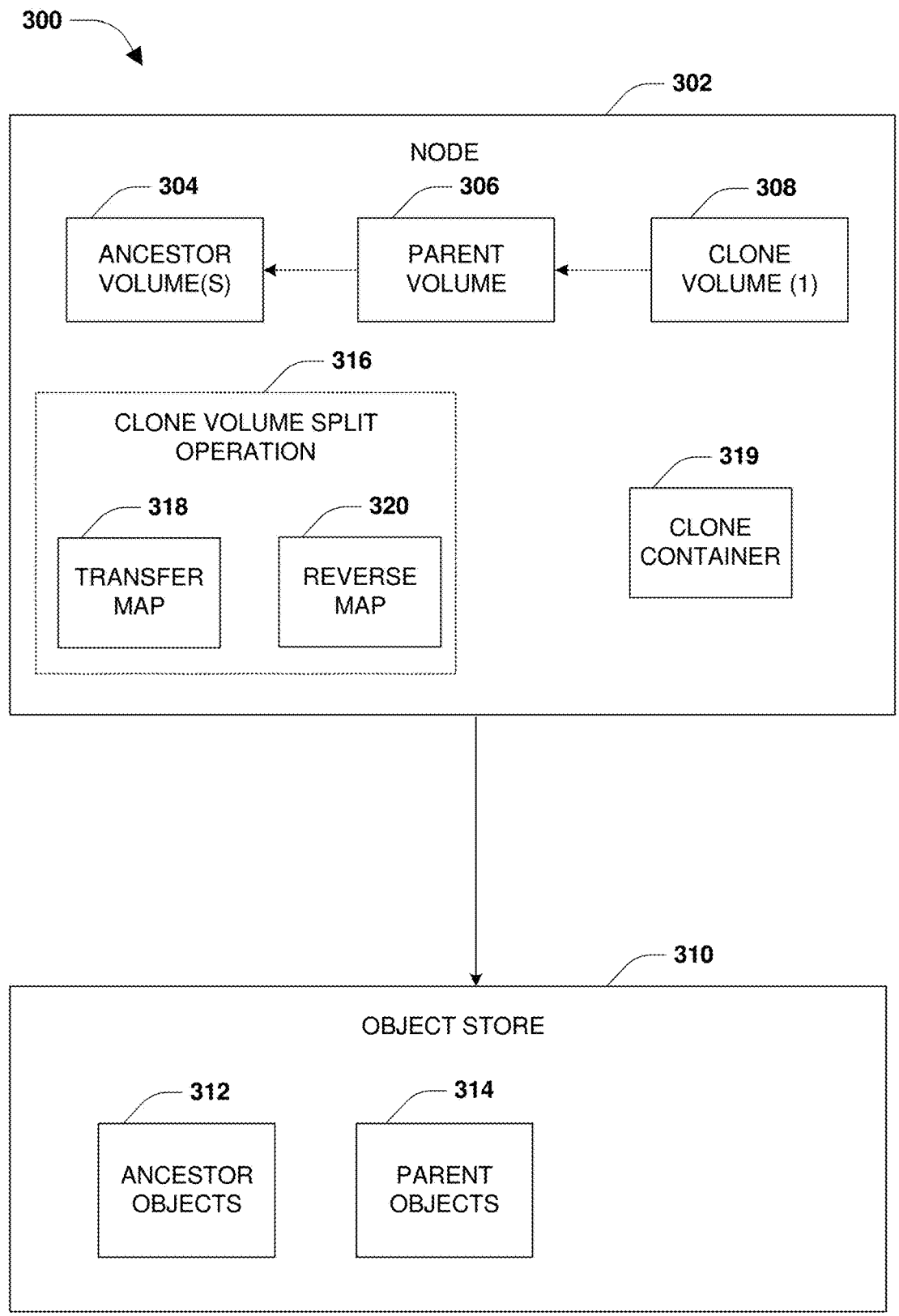
FIG. 3A is a block diagram illustrating an example of providing read access while performing a clone volume split operation where a transfer map and reverse map are created, in accordance with an embodiment of the present technology.
Figure 3B:
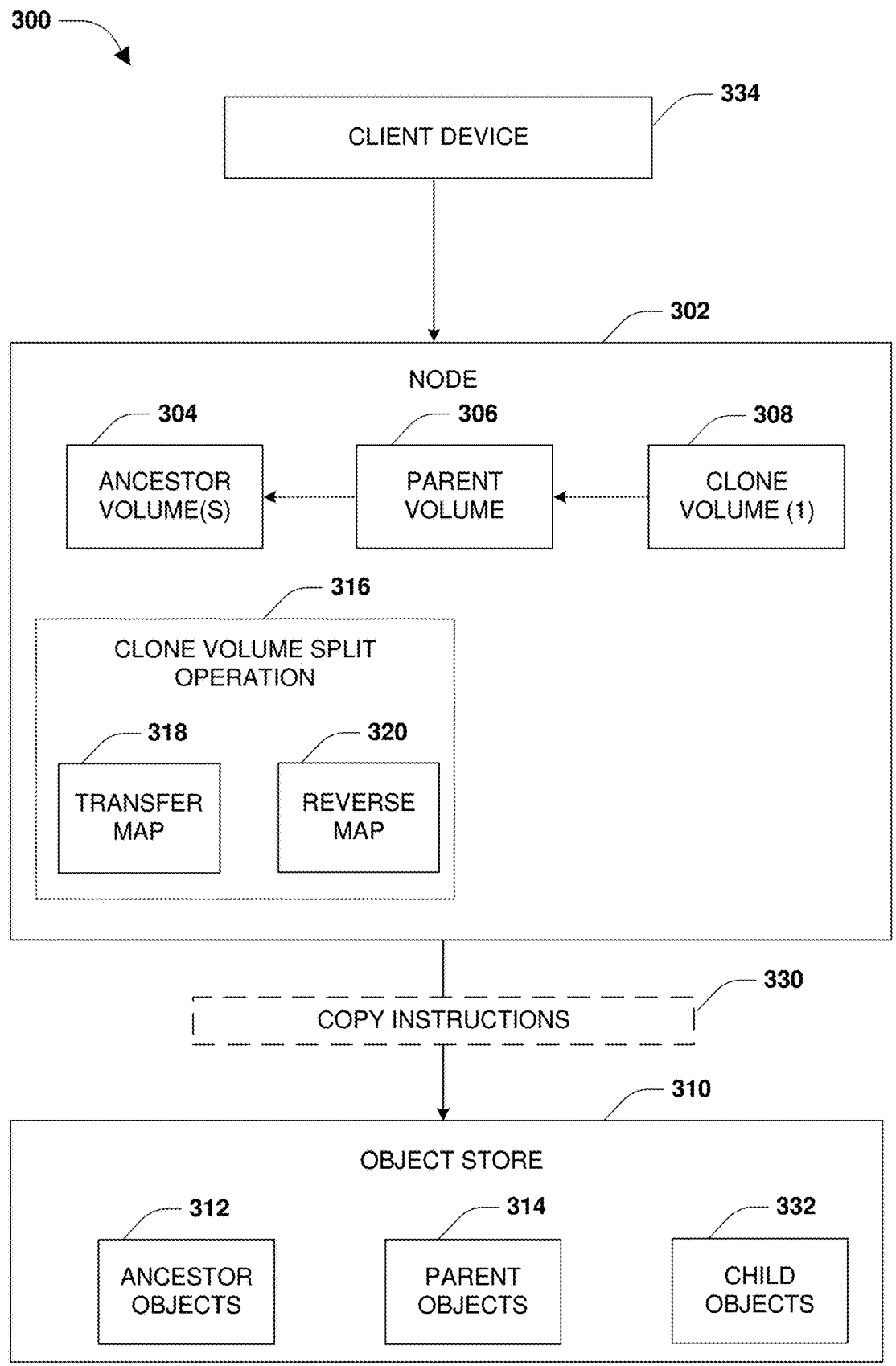
FIG. 3B is a block diagram illustrating an example of providing read access while performing a clone volume split operation, in accordance with an embodiment of the present technology.
Figure 3C:
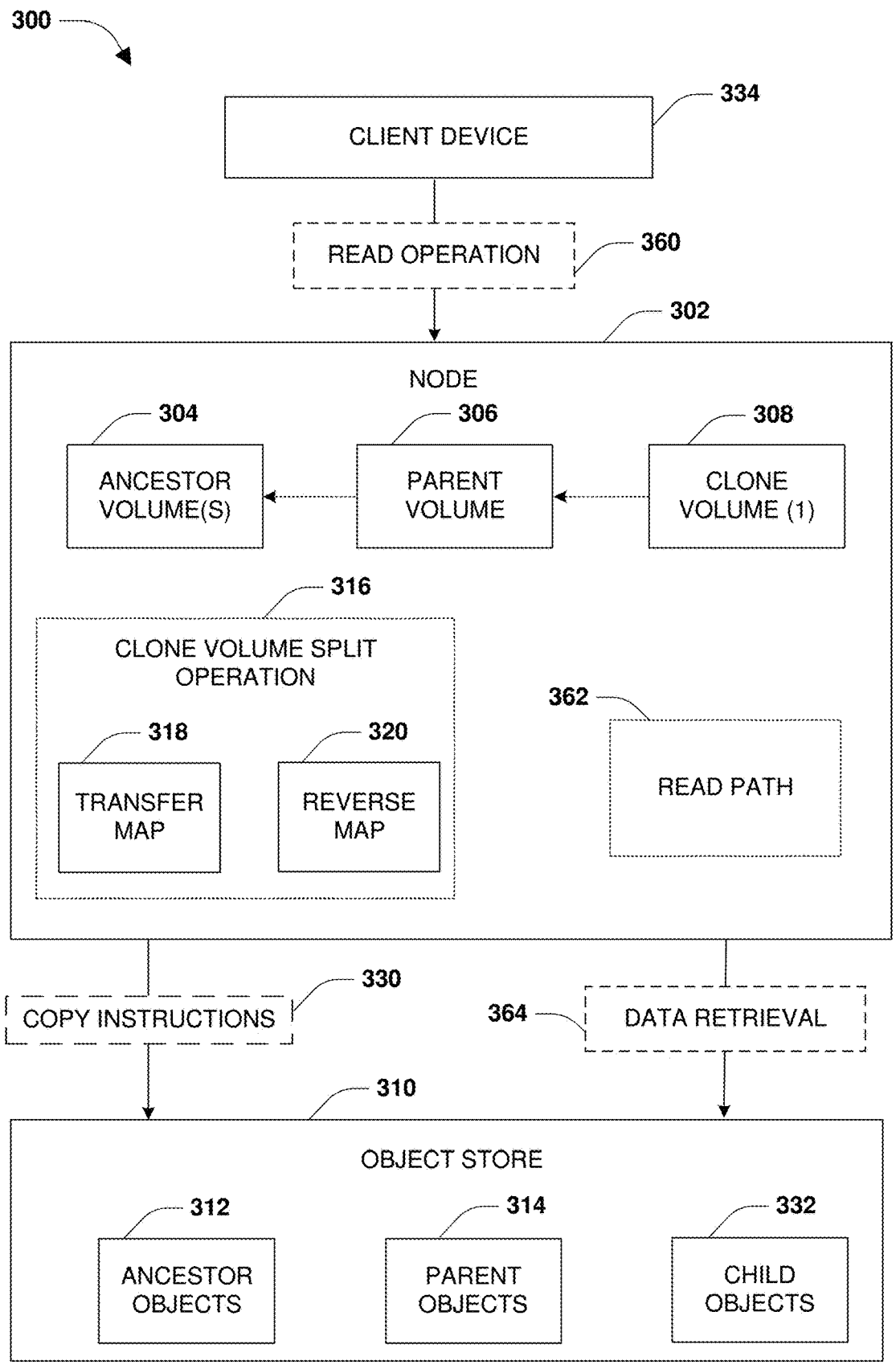
FIG. 3C is a block diagram illustrating an example of providing read access while performing a clone volume split operation, in accordance with an embodiment of the present technology.

FIG. 2 is a flow chart illustrating an example of a set of operations of a method 200 for providing read access while performing a clone volume split operation, which is described in relation to system 300 of FIGS. 3A-3C. A node 302 may host a parent volume 306 whose data has been tiered (or stored) to an object store 310 within parent objects 314, as illustrated by FIG. 3A. In some embodiments, the parent volume 306 may be a clone of an ancestor volume 304 whose data may be tiered (or stored) to the object store 310 within ancestor objects 312. In some embodiments, the parent volume 306 is not a clone of any other volume and is thus a standalone volume. A first clone volume 308 may be created as a clone of the parent volume 306, and thus the first clone volume 308 may reference (or point to) at least some data of the parent volume 306 that may be stored within the parent objects 314 and/or may reference at least some data of the ancestor volume 304 stored within the ancestor objects 312 if the parent volume 306 is a clone of the ancestor volume 304.

During operation 202 of method 200, a request may be received by the node 302 to split the first clone volume 308 from the parent volume 306 so that the first clone volume 308 becomes a standalone volume. Accordingly, a clone volume split operation 316 is executed in response to the request. As part of executing the clone volume split operation 316, a clone container 319 of the first clone volume 308 may be traversed for selectively creating child object identifiers. The child object identifiers will be subsequently used to copy the parent objects 314 to create child objects that will be assigned the child object identifiers. Because data of the parent volume 306 and/or data of the first clone volume 308 may not be shared since the parent volume 306 and the first clone volume 308 can diverge over time, only certain parent objects will need to be copied as part of splitting the first clone volume 308 from the parent volume 306.

During operation 204 of method 200, while traversing the clone container 319, a transfer map 318 is created and used to track mappings of child object identifiers to parent object identifiers encountered during the traversal of the clone container 319. In particular, an object (a parent object) may store e.g., 1024 blocks or any other number of blocks of data. If one of the blocks within the object is encountered by the traversal, then that block triggers the creation of a child object identifier. If the traversal later encounters a different one of the blocks within the object, then another child object identifier is not created since there is already a child object identifier that was created for the object. In response to the transfer map 318 indicating that a parent object has not yet been encountered by the traversal, a child object identifier is created. A mapping between the child object identifier and a parent object identifier of the parent object is populated into the transfer map 318. In response to the transfer map 318 indicating that the parent object has not yet been encountered by the traversal, the child object identifier is created, and the clone container 319 is updated with a cloud block number for the child object identifier. In this way, the clone container 319 is updated to point to block information for the child object that will be created (e.g., a clone container L1 (level 1) block is updated with a cloud physical volume block number for the child object identifier). In response to the transfer map 318 indicating that the parent object was already encountered by the traversal, a new child object identifier is not created when encountering a block of the parent object during the traversal.

In some embodiments of performing the traversal, a determination is made as to whether an object block information (also referred to as "info") hash has a hash entry for a child object identifier created during the traversal. In response to the object block info hash not having a hash entry for the child object identifier, the child object identifier, and a parent object identifier block info (of a parent object that will be copied to create a child object having the child object identifier) are added together into the object block info hash. In response to the object block info hash having a hash entry for the child object identifier, a reference count for the hash entry is updated (e.g., incremented). The object block info hash is created for use during a subsequent consistency point where each child object identifier within the object block info hash is processed.

A consistency point operation is performed after the traversal. During consistency point, each child object identifier that was created during the traversal and tracked within the object block info hash is processed. In some embodiments, the consistency point is performed using the hash entries within the object block info hash (i.e., hash entries for the child object identifiers). For a child object identifier that is to be subsequently assigned to a child object that will be created after the consistency point, an object state for the child object is set to a copy pending state to indicate that a corresponding parent object has not yet been copied (but is set to be copied) to create the child object. The object state may be tracked within object state info. A reference count is incremented for the parent object to be copied. Also, a reverse map 320 is populated with a reverse map entry that includes the child object identifier for the child object, a parent object identifier of the parent object to copy as the child object, a sequence number of the parent object (e.g., each object stored within the object store 310 may be assigned a unique sequence number such as monotonically increasing sequence numbers for each newly created object), and/or an identifier of the parent object (e.g., a buffer tree universal unique identifier (BTUUID) that identifies a buftree, of a file, that comprises indirect blocks for the file such that the indirect blocks of the buftree can locate data of the file). If the parent object is a copy of a different object (one of the ancestor objects 312) due to the parent volume 306 being a copy of the ancestor volume 304, the reverse map entry may be populate with information from a parent reverse map of the parent object. Otherwise, the reverse map entry is populated with information from the parent object if the parent object is not a copy of another object.

During operation 206 of method 200, the clone volume split operation 316 generates and transmits copy instructions 330 to the object store 310 to copy the parent objects 314 as the child objects 332 for splitting the first clone volume 308 from the parent volume 306 to create a standalone volume, as illustrated by FIG. 3B. In particular, the clone volume split operation 316 may traverse the transfer map 318 mappings parent object identifiers and child object identifiers to create the copy instructions 330. A copy instruction may comprise a command for the object store 310 to copy a parent object, having the parent object identifier specified by the command, and to create a child object that is assigned the child object identifier specified by the command. In some embodiments, a child object identifier is obtained from the transfer map 318 and a child object is initialized. The child object identifier is added to a pending queue to track child object identifiers for which copy instructions are to be or have been transmitted to the object store 310 for creating corresponding child objects. A copy instruction for the child object is transmitted to the object store 310 with a command instructing the object store 310 to copy a parent object, having a parent object identifier specified by the command, as the child object. The child object identifier is removed from the pending queue based upon the child object being verified using information within a reverse map 320.

During operation 208 of method 200, the reverse map 320 is used to verify that the child objects 332 are successfully created by the object store 310 with valid data. For a particular child object, the reverse map 320 comprises a child object identifier for the child object, a parent object identifier of a parent object copied as the child object, a sequence number of the parent object, and an identifier of the parent object. This information can be used to identify the parent object and the child object within the object store 310 to verify that the child object comprises an exact copy of the parent object, which may be verified by comparing the information with corresponding information stored within the header of the child object.

In some embodiments of verifying that a child object was successfully created with valid data, a copy instruction is transmitted to the object store 310 to copy a parent object as a child object. A reply may be received from the object store 310 for the copy instruction. In response to the reply indicating that the copy instruction was successful, a verify copy object request may be created using the information within the reverse map 320. The verify copy object request may be transmitted to the object store 310 to verify information within a header of the child object to see if the information within the header matches the information within the reverse map 320 for the child object. If the information does not match, then the copy instruction may be added to a retry list for subsequent retry. If the information matches, then the object state for the child object is changed from the copy pending state to a valid state, and a checkpoint for copying the parent objects 314 as the child objects 332 is updated to indicate that the parent object was successfully copied as the child object. The checkpoint can be used to resume the clone volume split operation 316 from where the clone volume split operation 316 left off such as in response to a failure occurring. If the reply from the object store indicated that the copy instruction was not successful, then the child object identifier is added into the retry list for subsequent retry to copy the parent object as the child object.

Because the object store 310 is "in-place" copying the parent objects 314 while the parent objects 314 are resident within the object store 310 without moving or transferring the parent objects 314 (e.g., creation of the child objects 332 do not move the parent objects 314 from a storage bucket where the parent objects 314 reside), the clone volume split operation 316 reduces network bandwidth, time, processing resources, and cost because the parent objects 314 are not being retrieved by the node 302 over a network from the object store 310, locally copied by the node 302 as the child objects 332, and then transmitted back over the network to the object store 310 as the child objects 332.

During operation 210 of method 200, read operations directed to the first clone volume 308 are processed during the clone split operation 316, as illustrated by FIG. 3C. The node 302 may receive a read operation 360 from a client device 334. In response to determining that the read operation 360 is received before the clone volume split operation 316 has completed, a custom read path 362 is implemented for processing the read operation 360. The read path 362 (or read path module 362) may determine that the read operation targets a block of the first clone volume 308. The read path 362 utilizes the transfer map 318, the reverse map 320, and/or the object block info hash to determine whether the block is part of a parent object that has been successfully copied as a child object or has not yet been successfully copied as the child object. In response to the read path 362 determining that the parent object has successfully been copied as the child object, a context check is performed using the reverse map 320 to verify that the block within the child object contains valid data. In response to the context check successfully verifying that the block within the child object contains valid data, the data of the block is retrieved 364 from the child object. If the read path 362 determines that the parent object has not yet been copied as the child object, the reverse map 320 is evaluated to identify the parent object identifier of the parent object. Accordingly, the read path 362 redirects the read operation 360 to the parent object to retrieve 364 the block from the parent object using the parent object identifier.

As part of performing the clone volume split operation 316, some parent objects may be freed after corresponding child objects are created (e.g., a parent object comprising data only referenced by the first clone volume 308 and no longer referenced by the parent volume 306 or other volumes). In response to freeing a parent object after creation of a child object, a sequence number of the parent object and an identifier of the parent object are retained for subsequent processing of read operations directed to the child object. Thus, when a subsequent read operation (or subsequent write operation) is redirected to a block within the child object, information within the subsequent read operation, the retained sequence number of the parent object, and the retained identifier of the parent object are used to identify the child object for processing the subsequent read operation. If the parent object is a copy of an ancestor object of the ancestor volume 304, then a sequence number of the ancestor object and an identifier of the ancestor object are instead retained for processing subsequent read operations directed to the child object.

In some embodiments of performing the clone volume split operation 316, the transfer map 318 is traversed to trigger transmission of batches of copy instructions 330 to the object store 310 using information within the transfer map 318. A list of successful copy instructions and a list of failed copy instructions are tracked for the batches of copy instructions 330 sent to the object store 310. A retry queue is maintained and utilized for retrying failed copy instructions within the list of failed copy instructions. Headers of child objects successfully created by the successful copy operations within the list of successful copy instructions are verified using information within the reverse map 320. In response to verifying the headers of a child object, an object state for the child object is changed to a valid state. In response to changing the object state for the child object to the valid state, a reference count for a parent object copied as the child object is decremented. If the reference count for an object is zero, then the object can be freed.

In some embodiments, the first clone volume 308 may be deleted during the clone volume split operation 316. Accordingly, child objects that have the copy pending state (e.g., child objects not yet successfully verified as being copied from parent objects) and/or have reference counts of zero (e.g., no volume or snapshot currently references data within the child objects) are freed. In response to freeing the child objects, reference counts for the parent objects are decremented (e.g., since the first clone volume is being deleted and no longer references the parent objects).

Figure 4:
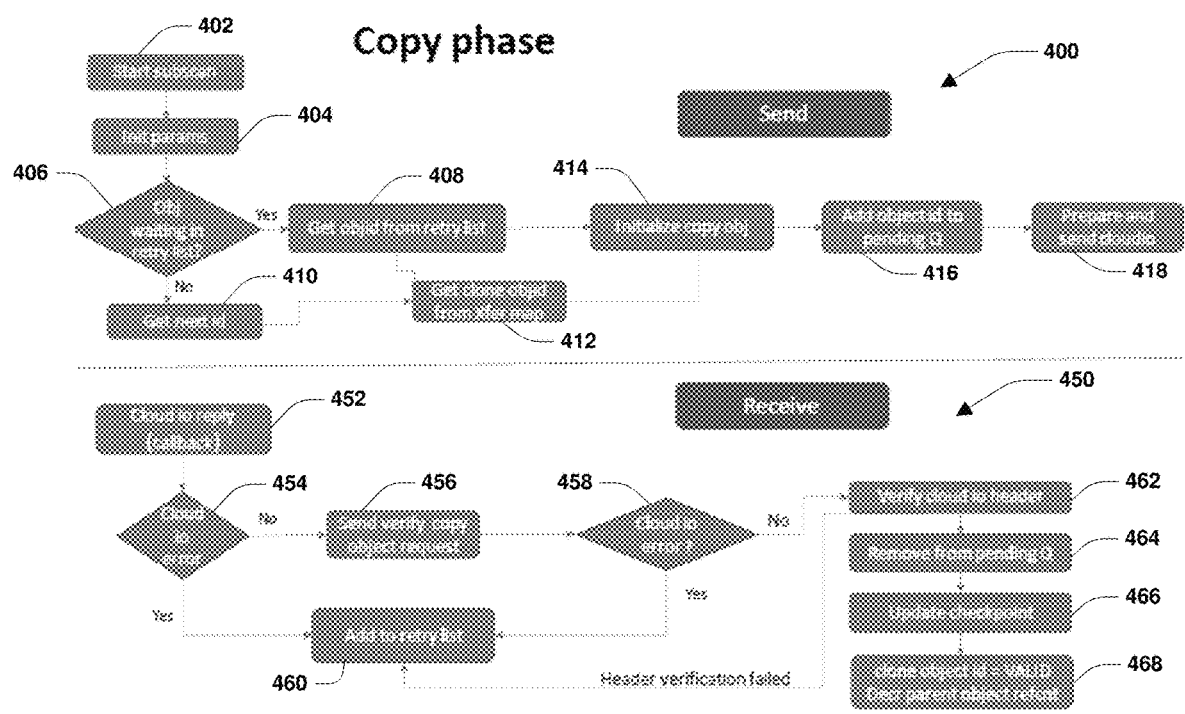
FIG. 4 is a flow chart illustrating an example of a set of operations of a method for performing a copy phase of a clone volume split operation, in accordance with various embodiments of the present technology.

FIG. 4 is a flow chart illustrating an example of a set of operations of a send method 400 and a receive method 450 for performing a copy phase of a clone volume split operation. During operation 402 of the send method 400, a subscan operation is initiated. During operation 404 of the send method 400, parameters (e.g., total_objects_to_process, current_progress_checkpoint, inflight_ios (Input/Output requests), current_object_id_being_worked_on, pending_io_lists, retry_io_lists, etc.) used by the subscan are initialized. During operation 406 of the send method 400, a determination is made as to whether an object (e.g., a child object to be created by copying a parent object) is waiting in a retry list. If the object is within the retry list, then a child object identifier of the object is retrieved from the retry list, during operation 408 of the send method 400. If the object is not within the retry list, then a next child object identifier is retrieved, during operation 410 of the send method 400. The child object identifier (clone objid) may be retrieved from a transfer map, during operation 412 of the send method 400. Accordingly, a copy object operation is initialized, during operation 414 of the send method 400. The child object identifier is added to a pending queue, during operation 416 of the send method 400. During operation 418 of the send method 400, a copy instruction for the child object identifier is prepared and sent to the object store to copy a parent object as a child object that will be assigned the child object identifier.

During operation 452 of the receive method 450, a reply is received from the object store for the copy instruction. During operation 454 of the receive method 450, the reply is evaluated to see if there was an error. During operation 456 of the receive method 450, if there was no error, then a verify copy object request is sent to the object store to verify that the child object was successfully created with valid data (e.g., information within a header of the child object is checked with information from a reverse map). During operation 458 of the receive method 450, if there is an error returned for the verify copy object request, then the child object identifier is added to a retry list, during operation 460 of the receive method 450. If there was an error specified by the reply, then the child object identifier is added to the retry list, during operation 460 of the receive method 450.

During operation 462 of the receive method 450, in response to a header of the child object being verified, the child object identifier is removed from the pending queue, during operation 464 of the receive method 450. During operation 466 of the receive method 450, a checkpoint is updated to indicate that the child object was created. The checkpoint can be used to resume the clone volume split operation from a point of where the clone volume split operation left off. During operation 468 of the receive method 450, an object state of the child object is set to valid, and a parent object reference count of the parent object is decremented.

Figure 5:
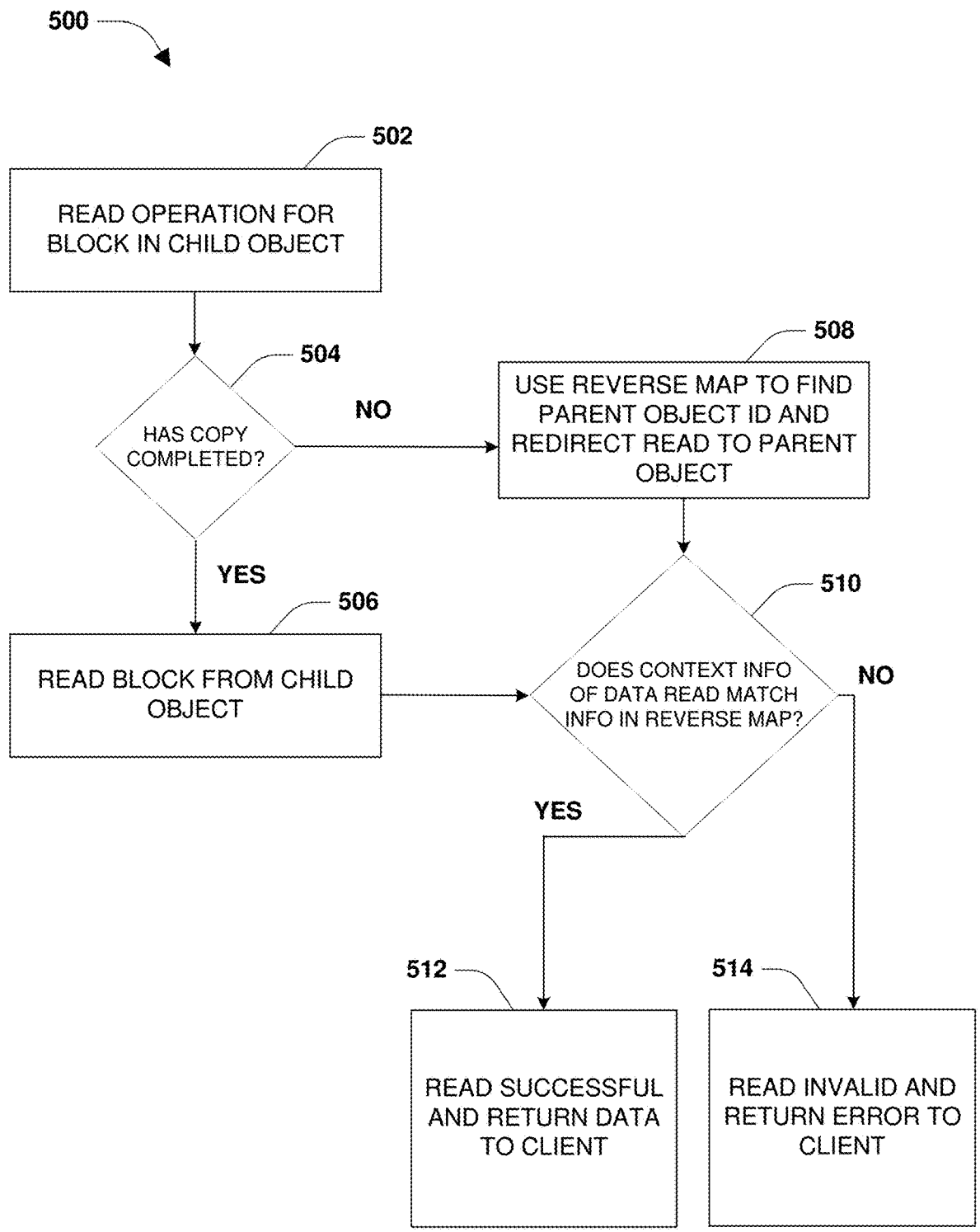
FIG. 5 is a flow chart illustrating an example of a set of operations of a method for providing read access while performing a clone volume split operation, in accordance with various embodiments of the present technology.

FIG. 5 is a flow chart illustrating an example of a set of operations of a method 500 implemented by a read path for providing read access while performing a clone volume split operation. During operation 502 of method 500, a read operation for a block in a child object is received (e.g., an object of a clone volume, such as a child object being or already copied from a parent object of a parent volume from which the clone volume was cloned). During operation 504 of method 500, a determination is made as to whether a copy operation for the child object has completed. If the copy operation has completed, then the block is read from the child object, during operation 506 of method 500. If the copy operation has not yet completed, then a reverse map (e.g., 320, FIG. 3C) is used to locate a parent object identifier of the parent object in the object store, and the read operation is redirected to the parent object, during operation 508 of method 500.

During operation 510, a verification is performed to determine whether context information of data read from the child object (e.g., information populated within a header of the child object, such as a child object identifier, a parent object identifier, a sequence number of the parent object, buffer tree universal unique identifier (BTUUID) of the parent object, and/or other information) matches information for the child identifier populated within the reverse map. If the context information matches the information within the reverse map, then the data of the child object is successfully returned to a client that submitted the read operation, during operation 512 of method 500. If the context information does not match the information within the reverse map, then an error is returned to the client, during operation 514 of method 500.

Figure 6:
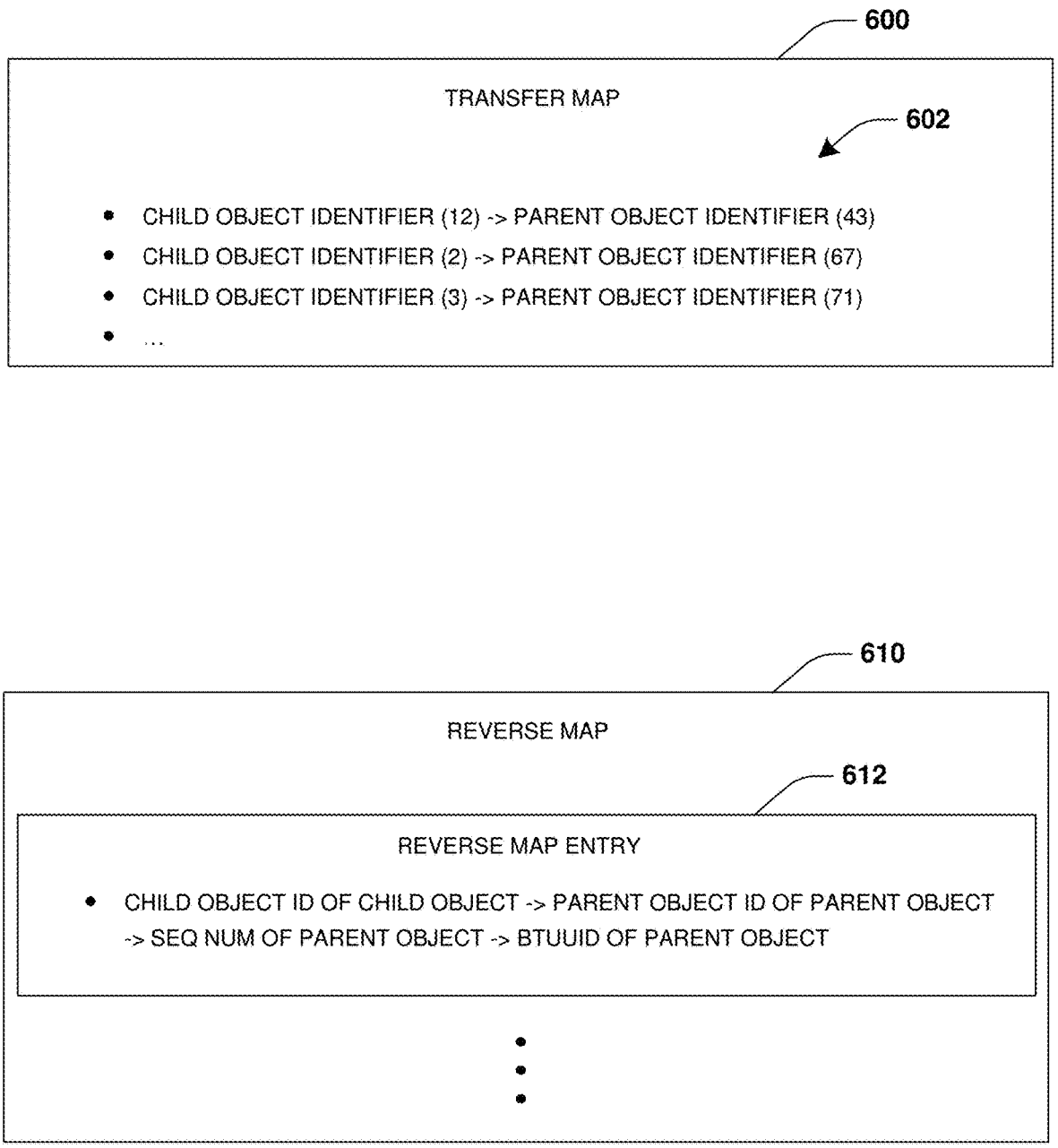
FIG. 6 is an example of a transfer map and a reverse map, in accordance with various embodiments of the present technology.

FIG. 6 is an example of a transfer map 600 and a reverse map 610.

The transfer map 600 is used to track mappings 602 between child object identifiers and parent object identifiers. As discussed above, the child object identifiers are created for child objects that are created by copying parent objects with corresponding parent object identifiers mapped to the child object identifiers. The reverse map 610 is populated with reverse map entries used to validate the creation of child objects and whether the child objects comprise valid data. For example, the reverse map 610 may be populated with a reverse map entry 612 comprising a child object identifier of a child object, a parent object identifier of a parent object, a sequence number of the parent object, and/or a buffer tree unique identifier (BTUUID) of the parent object.

Figure 7:
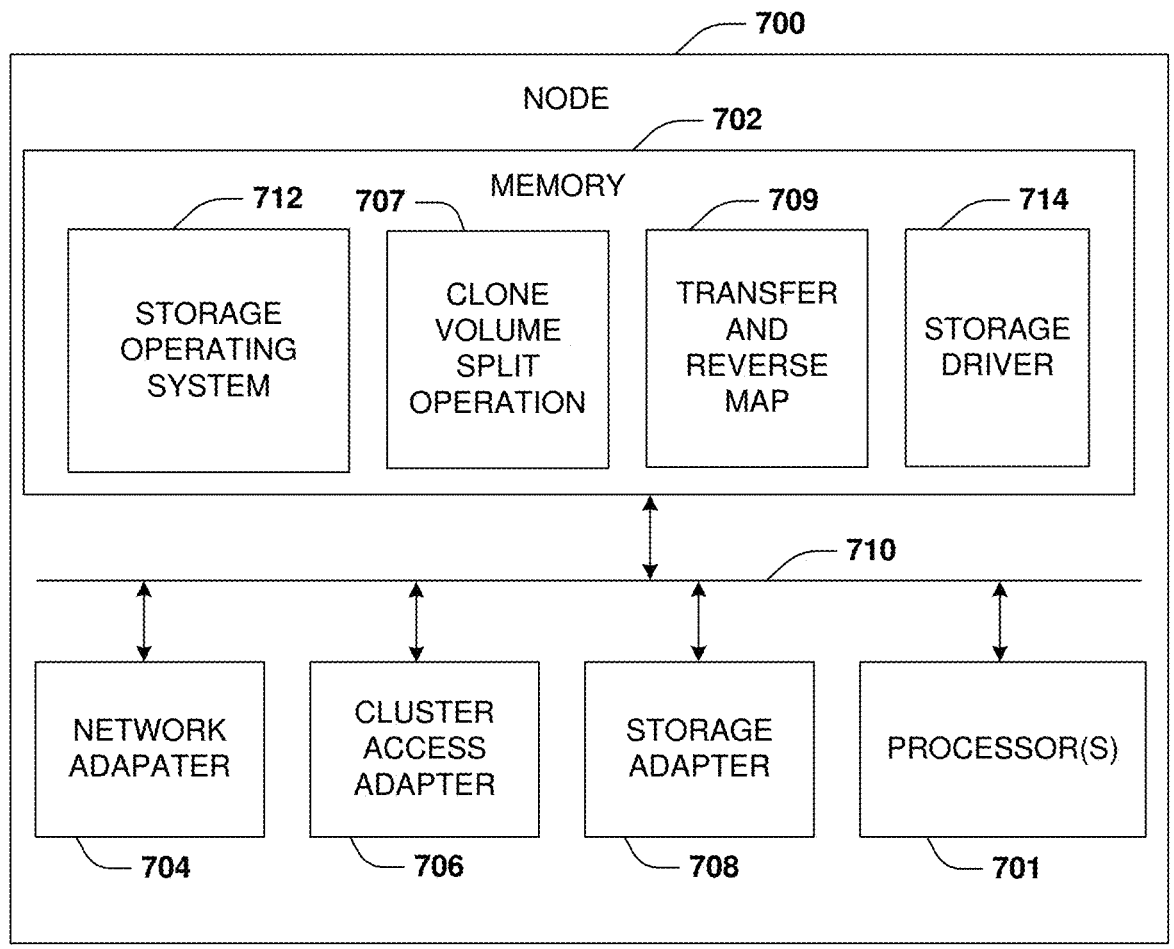
FIG. 7 is a block diagram illustrating an example of a node in accordance with various embodiments of the present technology.

FIG. 7 is a block diagram illustrating an example of a node in accordance with various embodiments of the present technology.

Referring to FIG. 7, a node 700 in this particular example includes processor(s) 701, a memory 702, a network adapter 704, a cluster access adapter 706, and a storage adapter 708 interconnected by a system bus 710. In other examples, the node 700 comprises a virtual machine, such as a virtual storage machine.

The node 700 also includes a storage operating system 712 installed in the memory 702 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 704 in this example includes the mechanical, electrical and signaling circuitry needed to connect the node 700 to one or more of the client devices over network connections, which may comprise, among other things, a point-to-point connection or a shared medium, such as a local area network. In some examples, the network adapter 704 further communicates (e.g., using TCP/IP) via a cluster fabric and/or another network (e.g., a WAN) (not shown) with storage devices of a distributed storage system to process storage operations associated with data stored thereon.

The storage adapter 708 cooperates with the storage operating system 712 executing on the node 700 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 708 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 708 and, if necessary, processed by the processor(s) 701 (or the storage adapter 708 itself) prior to being forwarded over the system bus 710 to the network adapter 704 (and/or the cluster access adapter 706 if sending to another node computing device in the cluster) where the information is formatted into a data packet and returned to a requesting one of the client devices and/or sent to another node computing device attached via a cluster fabric. In some examples, a storage driver 714 in the memory 702 interfaces with the storage adapter to facilitate interactions with the data storage devices.

The storage operating system 712 can also manage communications for the node 700 among other devices that may be in a clustered network, such as attached to the cluster fabric. Thus, the node 700 can respond to client device requests to manage data on one of the data storage devices or storage devices of the distributed storage system in accordance with the client device requests.

A file system module of the storage operating system 712 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 700, memory 702 can include storage locations that are addressable by the processor(s) 701 and adapters 704, 706, and 708 for storing related software application code and data structures. The processor(s) 701 and adapters 704, 706, and 708 may, for example, include processing elements and/or logic circuitry configured to execute the software code and manipulate the data structures.

The storage operating system 712, portions of which are typically resident in the memory 702 and executed by the processor(s) 701, invokes storage operations in support of a file service implemented by the node 700. Other processing and memory mechanisms, including various computer readable media, may be used for storing and/or executing application instructions pertaining to the techniques described and illustrated herein. For example, the storage operating system 712 can also utilize one or more control files (not shown) to aid in the provisioning of virtual machines.

In some embodiments, instructions for performing a clone volume split operation 707 may be stored within the memory 702 of the node 700 and executed by the processor(s) 701. As part of executing the clone volume split operation 707, transfer and reverse maps 709 may be created and stored within the memory 702.

The examples of the technology described and illustrated herein may be embodied as one or more non-transitory computer or machine readable media, such as the memory 702, having machine or processor-executable instructions stored thereon for one or more aspects of the present technology, which when executed by processor(s), such as processor(s) 701, cause the processor(s) to carry out the steps necessary to implement the methods of this technology, as described and illustrated with the examples herein. In some examples, the executable instructions are configured to perform one or more steps of a method described and illustrated later.

Figure 8:
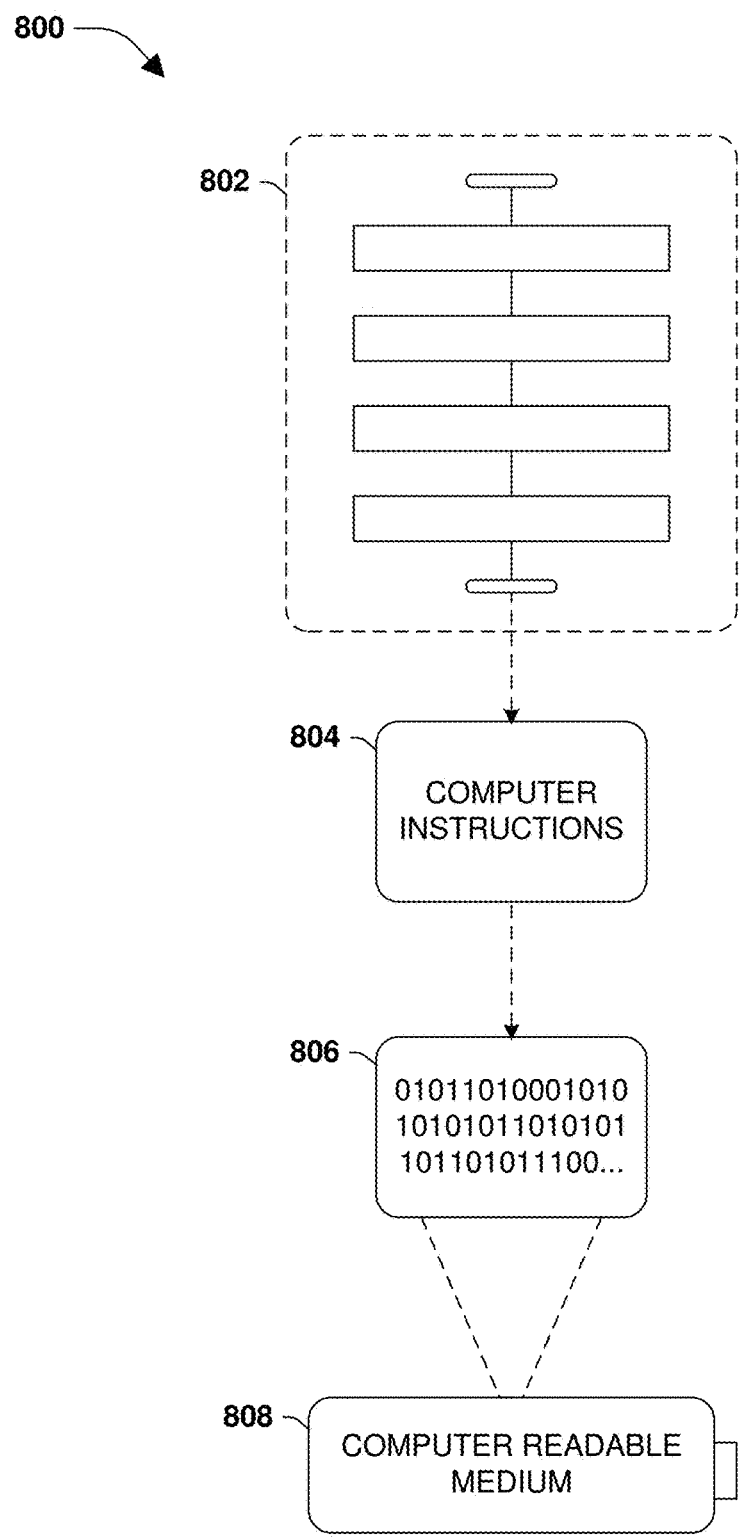
FIG. 8 is an example of a computer readable medium in which various embodiments of the present technology may be implemented.

FIG. 8 is an example of a computer readable medium 800 in which various embodiments of the present technology may be implemented. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. The computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform at least some of the exemplary methods 802 disclosed herein, such as method 200 of FIG. 2, for example. In some embodiments, the processor-executable computer instructions 804 are configured to implement a system, such as at least some of the exemplary systems disclosed herein, such as system 300 of FIGS. 3A-3C, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executed by one or more processors for providing read access during a split clone operation to split a clone volume from a parent volume whose data is stored in an object store as parent objects comprising:

creating a transfer map to track mappings of child object identifiers to parent object identifiers of the parent objects to copy as child objects having the child object identifiers;

traversing the transfer map for the object store to copy the parent objects as the child objects for the split clone operation;

verifying that the child objects are successfully created with valid data;

receiving a read operation targeting a block of the child object;

in response to determining that a parent object has been copied as the child object, performing a context check using a reverse map to verify the block within the child object, the block targeted by the read operation; and in response a successful context check, processing the read operation using the block of the child object.

2. The method of claim 1, comprising:
populating the reverse map with a reverse map entry that includes a child object identifier for the child object, a parent object identifier of a parent object to copy as the child object, a sequence number of the parent object, and an identifier of the parent object.

3. The method of claim 1, comprising:
in response determining that the parent object has not yet been copied as the child object, evaluating the reverse map to identify the parent object identifier of the parent object; and
redirecting the read operation to the parent object using the parent object identifier.

4. The method of claim 1, further comprising:
copying, by the object store, the parent objects residing in a storage bucket as the child objects in the storage bucket.

5. The method of claim 1, further comprising:
in response to freeing the parent object after creation of the child object, retaining a sequence number of the parent object and an identifier of the parent object for subsequently processing read operations directed to the child object.

6. The method of claim 1, further comprising:
transmitting a copy instruction to the object store to copy the parent object as the child object;
receiving a reply from the object store to the copy instruction; and
in response to the reply indicating that the copy instruction was successful, transmitting a get request to the object store as part of verifying information within a header of the child object using information within the reverse map.

7. The method of claim 1, further comprising:
transmitting a copy instruction to the object store to copy the parent object as the child object;
receiving a reply from the object store to the copy instruction; and
in response to the reply indicated that the copy instruction was not successful, adding the child object identifier into a retry list for a subsequent retry.

8. The method of claim 1, comprising:
in response to verifying information within a header of the child object using information from the reverse map, changing an object state for the child object from a copy pending state to a valid state and updating a checkpoint for copying the parent objects as the child objects.

9. The method of claim 1, comprising:
in response to the clone volume being deleted during the splitting of the clone volume, freeing child objects that have a copy pending state and have reference counts of zero; and
in response to the child objects being freed, decrementing reference counts for the parent objects.

10. The method of claim 1, further comprising:
in response to freeing the parent object after creation of the child object and the parent object being a copy of an ancestor object, retaining a sequence number of the ancestor object and an identifier of the ancestor object for subsequently processing read operations directed to the child object.

11. A non-transitory machine readable medium comprising instructions for performing a method for providing read access during a split clone operation to split a clone volume from a parent volume whose data is stored in an object store as parent objects, which when executed by a machine, causes the machine to perform operations comprising:
creating a transfer map to track mappings of child object identifiers to parent object identifiers of the parent objects to copy as child objects having the child object identifiers;
traversing the transfer map for the object store to copy the parent objects as the child objects for the split clone operation;
verifying that the child objects are successfully created with valid data;
receiving a read operation targeting a block of the child object;
in response to determining that a parent object has been copied as the child object, performing a context check using a reverse map to verify the block within the child object, the block targeted by the read operation; and
in response a successful context check, processing the read operation using the block of the child object.

12. The non-transitory machine readable medium of claim 11, wherein the operations comprise:
populating the reverse map with a reverse map entry that includes a child object identifier for the child object, a parent object identifier of a parent object to copy as the child object, a sequence number of the parent object, and an identifier of the parent object.

13. The non-transitory machine readable medium of claim 11, wherein the operations comprise:
copying, by the object store, the parent objects residing in a storage bucket as the child objects in the storage bucket.

14. The non-transitory machine readable medium of claim 11, wherein the operations comprise:
in response determining that the parent object has not yet been copied as the child object, evaluating the reverse map to identify the parent object identifier of the parent object; and
redirecting the read operation to the parent object using the parent object identifier.

15. The non-transitory machine readable medium of claim 11, wherein the operations comprise:
transmitting a copy instruction to the object store to copy the parent object as the child object;
receiving a reply from the object store to the copy instruction; and
in response to the reply indicated that the copy instruction was not successful, adding the child object identifier into a retry list for a subsequent retry.

16. The non-transitory machine readable medium of claim 11, wherein the operations comprise:
in response to verifying information within a header of the child object using information from the reverse map, changing an object state for the child object from a copy pending state to a valid state and updating a checkpoint for copying the parent objects as the child objects.

17. A computing device comprising:
a memory storing instructions for performing a method for providing read access during a split clone operation to split a clone volume from a parent volume whose data is stored in an object store as parent objects; and
a processor coupled to the memory, the processor configured to execute the instructions to perform operations comprising:
creating a transfer map to track mappings of child object identifiers to parent object identifiers of the parent objects to copy as child objects having the child object identifiers;
traversing the transfer map for the object store to copy the parent objects as the child objects for the split clone operation;
verifying that the child objects are successfully created with valid data;
receiving a read operation targeting a block of the child object;
in response to determining that a parent object has been copied as the child object, performing a context check using a reverse map to verify the block within the child object, the block targeted by the read operation; and
in response a successful context check, processing the read operation using the block of the child object.

18. The computing device of claim 17, wherein the operations comprise:
populating the reverse map with a reverse map entry that includes a child object identifier for the child object, a parent object identifier of a parent object to copy as the child object, a sequence number of the parent object, and an identifier of the parent object.

19. The computing device of claim 17, wherein the operations comprise:
copying, by the object store, the parent objects residing in a storage bucket as the child objects in the storage bucket.

20. The computing device of claim 17, wherein the operations comprise:
in response determining that the parent object has not yet been copied as the child object, evaluating the reverse map to identify the parent object identifier of the parent object; and
redirecting the read operation to the parent object using the parent object identifier.

* * * * *